No. 802,146. PATENTED OCT. 17, 1905.
O. W. JOHNSON.
CHANGEABLE SPEED GEARING.
APPLICATION FILED JUNE 29, 1904.
3 SHEETS—SHEET 2.
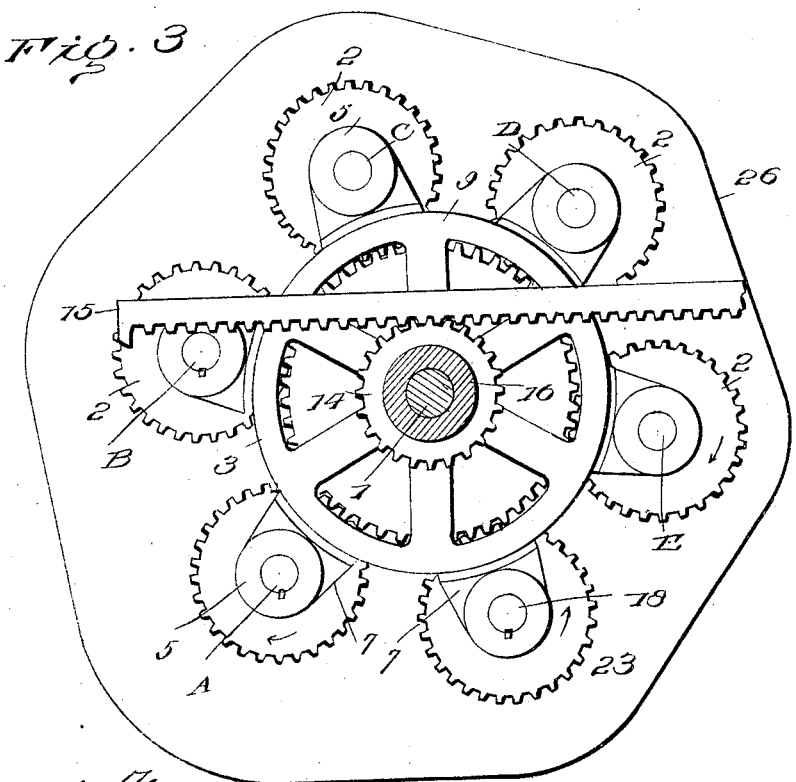
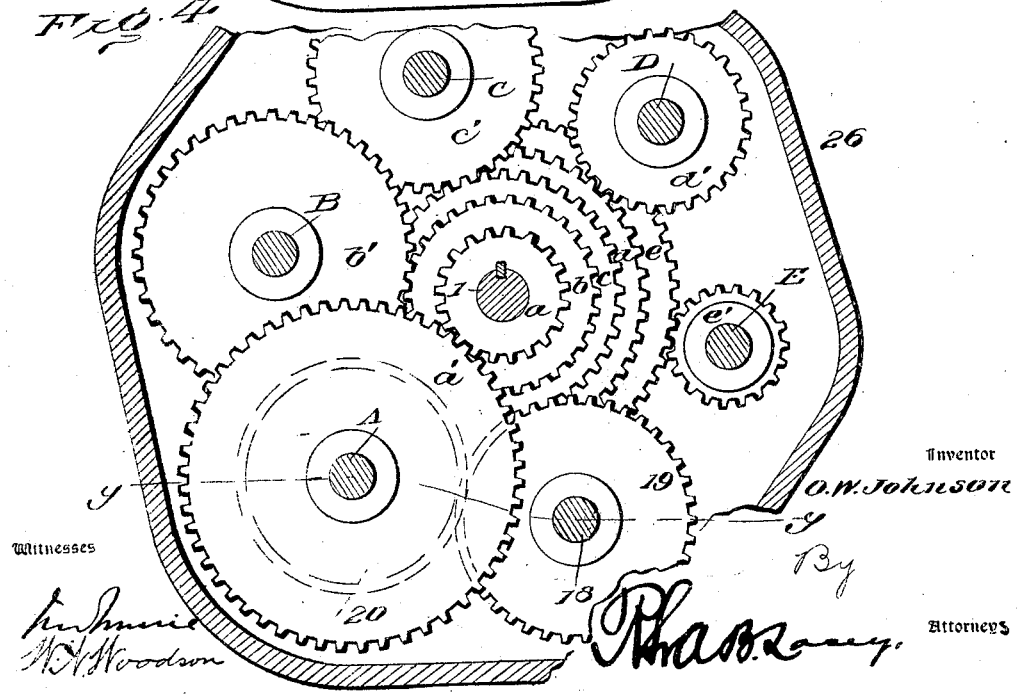

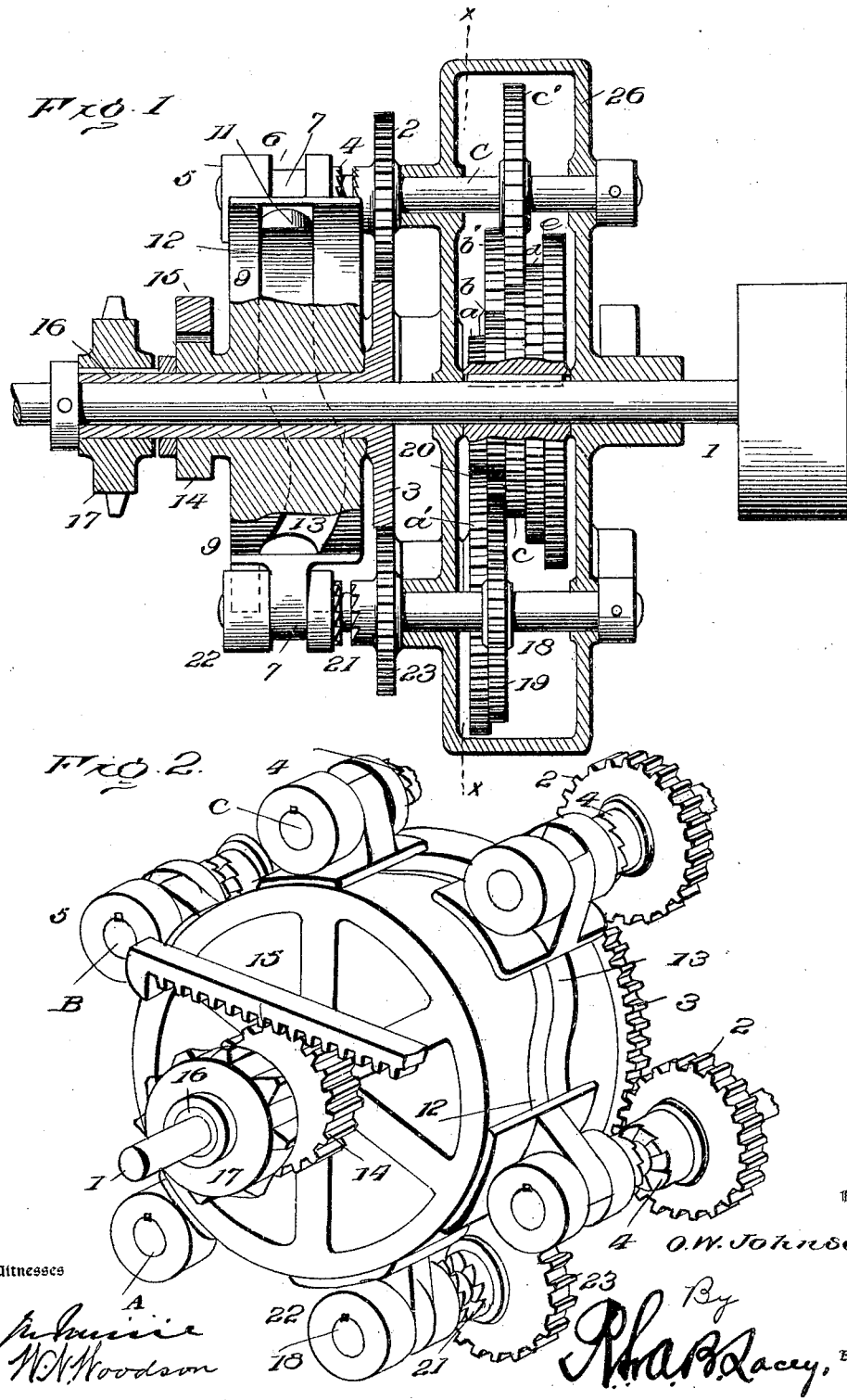

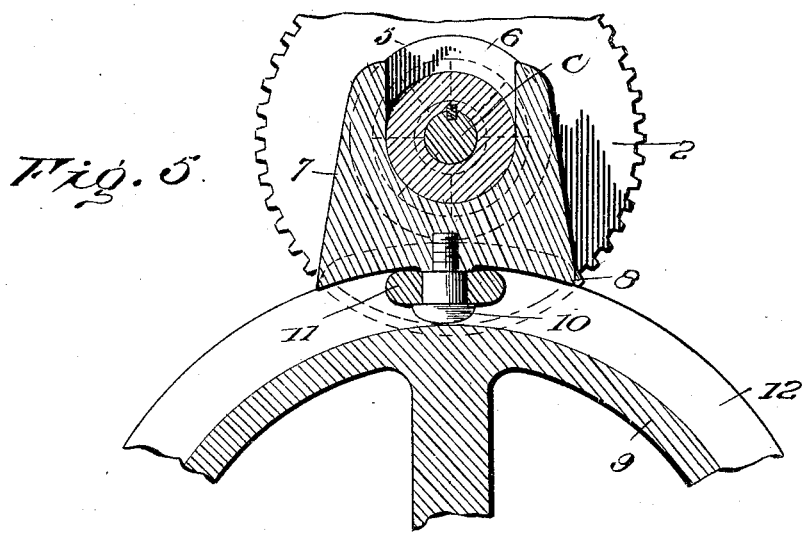
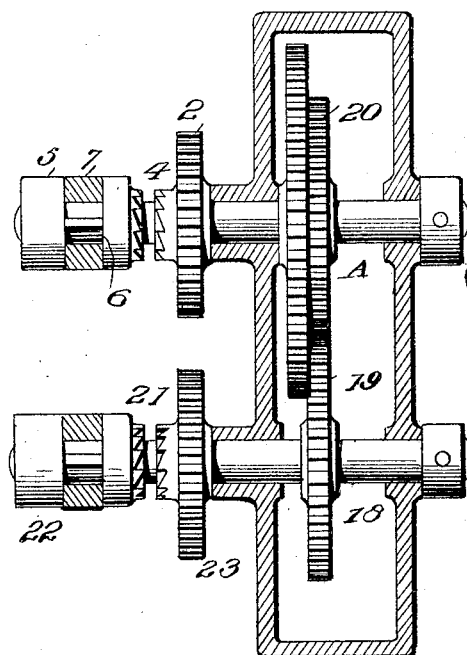
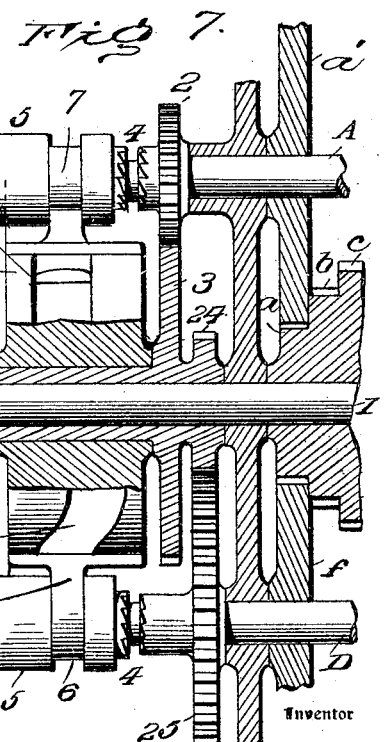

UNITED STATES PATENT OFFICE.

OLIVER WARREN JOHNSON, OF CLEVELAND, OHIO.

CHANGEABLE-SPEED GEARING.

No. 802,146.        Specification of Letters Patent.        Patented Oct. 17, 1905.

Application filed June 29, 1904. Serial No. 214,666.

*To all whom it may concern:*

Be it known that I, OLIVER WARREN JOHNSON, a citizen of the United States, residing at Cleveland, in the county of Cuyahoga and State of Ohio, have invented certain new and useful Improvements in Changeable-Speed Gearings, of which the following is a specification.

This invention provides a mechanism of novel formation for transmitting power and which will afford a wide range of speed in a minimum amount of space; admit of the gear elements remaining constantly in mesh; have the parts readily accessible for inspection, oiling, cleaning, repairing, or other purpose; permit of housing the gearing; insure a progressive transition from the lowest to the highest speed, and vice versa; embody a reverse, the latter preferably deriving power from the slow speed, and which will have the parts so arranged as to prevent coupling of any two speeds or gear-trains at the same time.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a front view of changeable-speed gearing embodying the invention, parts being broken away to show more clearly the relative arrangement of the elements. Fig. 2 is a detail perspective view of the outer ends of the power-transmitting shafts, the gear-wheels loosely mounted thereon, the clutches coöperating with the respective shafts and loose gears thereof, the shipper or clutch-actuator, and the operating means therefor. Fig. 3 is a side elevation of the invention, showing the power-driven shaft and the hollow shaft of the master-gear in section. Fig. 4 is a section on the line $x\,x$ of Fig. 1 looking to the right. Fig. 5 is an enlarged detail view of a portion of the shipper, a clutch, and the connecting-bracket. Fig. 6 is a plan section on the line $y\,y$ of Fig. 4. Fig. 7 is a longitudinal section of a modification.

Corresponding and like parts are referred to in the following description and indicated in all the views of the drawings by the same reference characters.

The power-driven shaft is indicated at 1 and may be connected in any manner with the engine or motor. A series of gears $a$, $b$, $c$, $d$, and $e$ are secured to the shaft 1 for rotation therewith and in the preferable construction are parts of a speed-cone. These gears increase in diameter throughout the series in order to drive the shafts geared thereto at a variable speed. The power-transmitting shafts A, B, C, D, and E are grouped about the shaft 1 and are parallel to one another and are provided with gear-wheels $a'$, $b'$, $c'$, $d'$, and $e'$, which are in mesh with the respective gear-wheels $a$, $b$, $c$, $d$, and $e$. Gear-wheels 2 are loose upon the several power-transmitting shafts and are in mesh with a master gear-wheel 3 in coaxial alinement with the power-driven shaft 1 and preferably loosely mounted thereon. The respective gear-wheels $a$, $b$, $c$, $d$, and $e$ are at all times in mesh with the corresponding gear-wheels $a'$, $b'$, $c'$, $d'$, and $e'$, and each of the gear-wheels 2 is at all times in meshing relation with the master gear-wheel 3. When the shaft 1 is in motion, all the power-transmitting shafts are correspondingly driven, but at different rates of speed, depending upon the relative diameters of the coöperating gear-wheels. When one of the gear-wheels 2 is caused to rotate with its supporting-shaft, the master-wheel 3 is driven at a corresponding rate of speed. This is effected by providing each of the power-transmitting shafts with a clutch 4, comprising a sleeve 5, keyed to the power-transmitting shaft, so as to rotate therewith, but free to have a longitudinal movement thereof. Companion clutch elements or teeth are provided upon the opposing portions of the sleeves 5 and coöperating gear-wheels 2. When the sleeves 5 are moved inward, the teeth or clutch elements engage and compel rotation of the gear-wheel 2 with its supporting-shafts, thereby imparting movement to the master-wheel 3. Each of the sleeves 5 is provided with an annular groove 6 to receive the forked portion 7 of the shipper-bracket. Each of the shipper-brackets has a base 8 curved upon its inner side to conform to the circumference of the shipper 9, mounted in coaxial alinement with the power-driven shaft 1. A headed stud 10 projects from the inner end of each shipper-bracket and supports a roller 11, which is arranged to travel in a groove 12, formed in the periphery of the shipper 9. A portion of the groove 12 is deflected, as shown at 13, to provide a cam for imparting lateral movement to the shipper-brackets and the clutch elements 5.

The shipper 9 consists of a wheel or disk mounted in coaxial alinement with the power-driven shaft 1 and is adapted to be rotated either to the right or to the left, as may be required to throw the desired speed gear-train into action. Any means may be devised for effecting a rotary movement of the shipper. As shown, a gear-wheel 14 is connected with said shipper, and a rack-bar 15 is in mesh therewith. A longitudinal movement of the rack-bar 15 causes the shipper 9 to rotate. As the shipper 9 turns the cam 13 correspondingly moves and throws the gear-trains successively into and out of action. It will thus be understood that one gear-train only can be in operation at the same time and it is impossible to jump from the slowest gear-train to the highest, or vice versa, because the arrangement of the parts is such as to necessitate the throwing of the intermediate gear-trains into and out of action, whereby the transition is gradual and progressive.

The master gear-wheel 3 is in coaxial alinement with the power-driven shaft and is preferably mounted thereon and is supplied with a tubular shaft 16, upon which the shipper 9 is mounted. A gear element 17 is secured to the hollow shaft 16, so as to rotate therewith, and the power is taken therefrom for operating the machine or part to be driven. The gear element 17 may be a sprocket-wheel for coöperation with a sprocket drive-chain (not shown) when the same is used for transmitting power to the parts to be operated.

For reversing the motion a shaft 18 is supplied and arranged intermediate of the power-transmitting shafts A and E and is provided with a gear-wheel 19, in mesh with a companion gear-wheel 20, secured to the shaft A. The shaft 18 deriving its motion from the power-driven shaft through the shaft A is rotated in an opposite direction to the power-transmitting shafts; hence when geared to the master-wheel 3 causes the latter to rotate in a reverse direction. A clutch 21, similar to any one of the clutches 4, coöperates with a sleeve 22 and a gear-wheel 23, the latter being loose upon the shaft 18 and in mesh with the master-wheel 3. The sleeve 22 is keyed to the shaft 18, so as to rotate therewith, but is free to move thereon to throw the clutch 21 into and out of engagement, said operation being accomplished by means similar to those provided for operating the clutch-sleeves 5 from the shipper 9. When the highest gear-train is in operation, the shipper 9 is at the limit of its movement in one direction, thereby preventing passing therefrom to the reverse gear-train. The shipper is at the limit of its movement in the opposite direction when the reverse gear-train is in operation, so that it is impossible to pass from the reverse gear-train to the highest-speed gear-train. Should it become necessary from any cause to reverse the motion, the shipper must be turned, so as to move from the highest-speed gear-train to the lowest in succession and from the lowest-speed gear-train to the reverse gear-train, thereby preventing undue strain upon the machine and gearing. While it is preferred to connect the reverse gear-train with the lowest-speed gear-train, it is to be understood that said reverse gear-train may be connected with any one of the speed gear-trains.

The number of speed gear-trains may be increased without adding to the number of the speed gear-wheels keyed to the power-driven shafts. This is accomplished by providing other master-wheels, as indicated at 24 in Fig. 7. This necessitates the provision of other power-transmitting shafts, as F, to which is secured a gear-wheel $f$, meshing with a speed-gear with which another power-transmitting shaft is in gear. A gear-wheel 25, loose upon the shaft F, is in mesh with the master-wheel 24 and is adapted to be clutched to the shaft in substantially the same manner as any one of the gear-wheels 2. The master-wheel 24 and gear-wheel 25 are of different relative diameters to the master-wheel 3 and intermeshing gear-wheels 2. Obviously any number of master-wheels may be provided, thereby increasing the range of movement without adding to the number of the primary-speed gear-wheels $a$, $b$, $c$, $d$, and $e$ and without materially increasing the size of the speed-gearing as a whole. The several shafts are journaled in a frame 26, which may constitute a housing, so as to protect the several gear-trains.

Having thus described the invention, what is claimed as new is—

1. In changeable-speed gearing, the combination of a power-driven shaft, a second shaft coaxial with the power-driven shaft and adapted to have the power taken therefrom for operating the machine or part to be driven, a series of power-transmitting shafts grouped about the power-driven shaft, speed gear-trains between the power-driven shaft and the series of power-transmitting shafts, a master-wheel connected with the aforementioned second shaft for rotation therewith, gear-wheels loose upon the respective power-transmitting shafts and in mesh with the master-wheel, and means for connecting the loose gear-wheels with their supporting-shafts to impart the required speed to the master-wheel, substantially as described.

2. In changeable-speed gearing, the combination of a power-driven shaft, a second shaft coaxial with the power-driven shaft and adapted to have the power taken therefrom for operating the machine or part to be driven, a series of power-transmitting shafts grouped about the power-driven shaft, speed gear-trains between the power-driven shaft and the series of power-transmitting shafts, a master-wheel connected with the aforementioned second shaft for rotation therewith, gear-wheels loose upon the respective power-transmitting shafts and in mesh with the master-wheel, a clutch for each loose gear-wheel, a shipper, connecting means between the shipper and each of the clutches, and means for operating the shipper for successively throwing the clutches into and out of action, substantially as set forth.

3. In changeable-speed gearing, the combination of a power-driven shaft, a second shaft coaxial with the power-driven shaft and adapted to have the power taken therefrom for operating the machine or part to be driven, a series of power-transmitting shafts grouped about the power-driven shaft, speed gear-trains between the power-driven shaft and the series of power-transmitting shafts, a master-wheel connected with the aforementioned second shaft for rotation therewith, gear-wheels loose upon the respective power-transmitting shafts and in mesh with the master-wheel, a clutch for each loose gear-wheel, a shipper consisting of a wheel or disk mounted coaxially with the power-driven shaft and having its peripheral portion in engagement with the series of clutches and having a part of said engaging portion deflected to form a cam, and means for rotating the shipper to successively throw the clutches into and out of action, substantially as described.

4. In changeable-speed gearing, the combination of a power-driven shaft, a second shaft coaxial with the power-driven shaft and adapted to have the power taken therefrom for operating the machine or part to be driven, a series of power-transmitting shafts grouped about the power-driven shaft, speed gear-trains between the power-driven shaft and the series of power-transmitting shafts, a master-wheel connected with the aforementioned second shaft for rotation therewith, gear-wheels loose upon the respective power-transmitting shafts and in mesh with the master-wheel, a clutch for each loose gear-wheel comprising a sleeve having an annular groove, a rotary shipper mounted coaxially with the power-driven shaft and having a cam portion, brackets forming connecting means between the shipper and each of the clutch-sleeve elements and having a portion in positive engagement with said shipper, and means for rotating the latter for successively throwing the aforesaid clutches into and out of action, substantially as set forth.

5. In changeable-speed gearing, the combination of a power-driven shaft, a second shaft coaxial with the power-driven shaft and adapted to have the power taken therefrom for operating the machine or part to be driven, a series of power-transmitting shafts grouped about the power-driven shaft, speed gear-trains between the power-driven shaft and the series of power-transmitting shafts, a master-wheel connected with the aforementioned second shaft for rotation therewith, gear-wheels loose upon the respective power-transmitting shafts and in mesh with the master-wheel, a clutch for each loose gear-wheel comprising a sleeve having an annular groove, a rotary shipper mounted coaxially with the power-driven shaft and having a peripheral groove deflected in its circumferential length to provide a cam, brackets in engagement with the aforesaid clutch-sleeve elements and supported by means of the shipper, and pulleys journaled to the brackets and entering the peripheral groove of said shipper, substantially as specified.

6. In changeable-speed gearing, the combination of a power-driven shaft, a master-wheel coaxial therewith, power-transmitting shafts grouped about the power-driven shaft, speed gear-trains between the power-driven shaft and the power-transmitting shafts, connecting means between the power-transmitting shafts and the master-wheel embodying clutches, a reverse gearing deriving motion from one of the said power-transmitting shafts, and connecting means between said reverse gear and the master-wheel including a clutch, substantially as described.

7. In changeable-speed gearing, the combination of a power-driven shaft, a master-wheel coaxial therewith, power-transmitting shafts, speed gear-trains between the power-driven shaft and the power-transmitting shafts, gear-wheels loose upon the power-transmitting shafts and in mesh with said master-wheel, clutch mechanisms between the loose gear-wheels and their supporting shafts, a reversing-shaft geared to the slow-speed power-transmitting shaft, a gear-wheel loose upon the reversing-shaft and in mesh with the master-wheel, a clutch between the reversing-shaft and the loose gear-wheel supported thereon, and a shipper for operating the several clutches in successive order, substantially as set forth.

In testimony whereof I affix my signature in presence of two witnesses.

OLIVER WARREN JOHNSON. [L. S.]

Witnesses:
H. A. WAUGERIEU,
CHAS. F. MORGERNSTERN.